US007377404B2

(12) United States Patent
Cherfane

(10) Patent No.: US 7,377,404 B2
(45) Date of Patent: May 27, 2008

(54) MODULAR MIXING ASSEMBLY AND DISPENSING DEVICE

(76) Inventor: Raymond C. Cherfane, 6411 Vicksburg Ct., Acworth, GA (US) 30101

( * ) Notice: Subject to any disclaimer, the term of this patent is extended or adjusted under 35 U.S.C. 154(b) by 728 days.

(21) Appl. No.: 11/020,621

(22) Filed: Dec. 22, 2004

(65) Prior Publication Data

US 2006/0131333 A1 Jun. 22, 2006

(51) Int. Cl.
*B67D 5/60* (2006.01)
*A01G 25/14* (2006.01)

(52) U.S. Cl. ............................... 222/145.1; 222/145.5; 222/135; 239/378; 239/399; 239/433

(58) Field of Classification Search ............. 222/145.1, 222/145.2, 145.3, 145.4, 145.5, 145.6, 145.7, 222/145.8, 132, 135; 239/123, 304, 308, 239/375, 378, 379, 399, 433
See application file for complete search history.

(56) References Cited

U.S. PATENT DOCUMENTS 2,068,205 A * 1/1937 Steckel, Jr. et al. .......... 239/133
4,377,256 A * 3/1983 Commette et al. .......... 239/117
4,471,887 A * 9/1984 Decker ........................ 222/135
4,913,317 A * 4/1990 Wernicke ........................ 222/1
4,993,596 A 2/1991 Brown ........................ 222/145
5,004,125 A * 4/1991 Standlick ..................... 222/23
5,104,006 A 4/1992 Brown ........................ 222/145
5,180,082 A 1/1993 Cherfane .................... 222/145
5,246,143 A 9/1993 Cherfane .................... 222/145
5,265,761 A * 11/1993 Brown .......................... 222/1
6,161,725 A 12/2000 Dean ........................... 222/23
6,616,068 B2 9/2003 Hunter ....................... 239/398
6,672,519 B2 1/2004 Hunter et al.

* cited by examiner

*Primary Examiner*—Kevin P. Shaver
*Assistant Examiner*—Stephanie E Tyler
(74) *Attorney, Agent, or Firm*—McCracken & Frank LLP

(57) ABSTRACT

A modular dispensing device for mixing and dispensing reactive components includes a body, a triggering device, a dispensing cartridge, a control device, and a modular mixing assembly. The modular mixing assembly includes a primary central body shaped to accept the dispensing cartridge, the primary central body having a pair of opposed primary central body passages, two modular valve blocks to channel flow of a fluid from external sources to one of the primary central body passages, a secondary central body assembly attached to a downstream end of the primary central body, and a modular tip adapter mounted to the secondary central body and surrounding a tip of the dispensing cartridge and having an adapter passage for the flow of fluid to mix with fluid exiting the dispensing cartridge tip.

37 Claims, 11 Drawing Sheets

MODULAR MIXING ASSEMBLY AND DISPENSING DEVICE

CROSS REFERENCE TO RELATED APPLICATIONS

Not applicable

REFERENCE REGARDING FEDERALLY SPONSORED RESEARCH OR DEVELOPMENT

Not applicable

SEQUENTIAL LISTING

Not applicable

BACKGROUND OF THE INVENTION

1. Field of the Invention

This invention relates to mixing devices for mixing and dispensing reactive chemical streams. More particularly, this invention relates to a modular mixing device that provides flexibility to enable the device to be reconfigured to accurately mix and dispense different reactive input streams as a properly mixed end product.

2. Description of the Background of the Invention

Reactive chemical compositions, such as polyurethane foam compositions are well known in the art. These compositions typically are combined shortly before use by combining or intimately mixing the two reactive chemical components. For polyurethane foam, the two components are a polyol and an isocyanate. These two materials are highly reactive and readily react at various temperatures to form a foam material with a wide range of physical properties. Typical uses for these polyurethane foams include thermal insulation, floatation, cushioning for packaging, and the like. Most polyurethane foams used for insulation, floatation and packaging are rigid foams. These rigid polyurethane foams are formed when the polyol and isocyanate components are mixed. Upon mixture, the reaction commences and a voluminous foam is formed as the reaction products and/or optional blowing agents build volume within the reactive foam structure. As the reaction continues the foam hardens or becomes rigid.

Within the insulation industry, the two components are stored in separate drums or containers and are mixed just prior to the foam being placed within a structure to be insulated. In a manufacturing setting, this can include refrigerator or freezer walls, cooling chests, storage units and the like. In this setting, a dispensing device, often hand held, is used to both mix and dispense the foam into the cavity to be insulated. There have been numerous hand held devices, such as that disclosed in U.S. Pat. No. 5,246,143, to mix and dispense reactive chemical streams such as the two part streams used to make polyurethane foam in situ. The device disclosed in this patent mixed two streams in a valve cartridge that is removable and can be disposed if the cartridge becomes fouled by reacted polymer.

In the past, chemical manufacturers produced foam insulation products as two premixed component foam compositions. These premixed components included the polyol component and the isocyanate component blended with various additives such as catalyst packages, blowing agents, curing agents, modifiers, colorants, and the like.

Recently, there has been a trend by chemical manufacturers to offer the end users incomplete pre-blend formulas intended for special applications. These pre-blend formulations typically do not contain the blowing agent, in part because of the special shipping and handling requirements for compositions containing blowing agents. In this case, the manufacturer provides components and pre-blends with instructions on the proper formulation of these materials to achieve specific results. As a result, the end users must now mix and blend the necessary blowing agents with one of the primary chemical components, typically the polyol, often requiring a significant investment in equipment, and engineering time. At present, there is no convenient way for an end user to custom blend these materials at the dispensing device to achieve custom individualized results.

In the past, the devices that were designed to mix and dispense these two part reactive compositions did not include the ability to mix various additive and additive packages into one or both of the main reactive chemical streams These prior devices do not have the flexibility to handle the task of custom mixing various input streams to enable a manufacturer or installer to easily prepare two part components systems in situ from the individual chemical components that are currently available from and usually sold by chemical manufacturers. Also, because these devices were developed to meet the needs based on prior complete and fully blended systems, they may not be able to handle the needs of a user that must accurately blend multiple components as they are being used and may need to adjust that blend during the dispensing process.

Depending on the specific type of foam to be produced, the dispensing devices must be able to adapt to these changing needs. For instance, a foam that is placed within a cavity may need a device that includes an extension of the exit tip or port so that the foam will be unconfined only after it enters the void volume and thereafter will expand to properly fill the entire void volume. In other applications, the foam will be sprayed on the exterior of a shape. In this instance, the foam components will be mixed with a carrier stream such as air as the foam components are sprayed onto the surface to be coated. In this instance, the foam will be formed either as the foam components are first dispensed or will expand once the components are deposited on the coating surface.

SUMMARY OF THE INVENTION

One embodiment of the present invention is directed to a modular mixing assembly for use with a dispensing cartridge having a dispensing cartridge tip, where the cartridge is used to dispense a reactive chemical composition. The assembly comprises a primary central body shaped to accept the dispensing cartridge, where the primary central body has an upstream end and a downstream end, and has a pair of opposed primary central body passages that each extend from a primary central body inlet port to a primary central body exit port. The primary central body exit port is spaced to interconnect with corresponding dispensing cartridge inlet ports. The assembly also includes a first modular valve block that channels the flow of a fluid from a first external source to one of the primary central block inlet ports and a second modular valve block that channels the flow of a fluid from a second external source to the other of the primary central block inlet ports. Further, the assembly has a secondary central body assembly attached to the downstream end of the primary central body, where the secondary central body assembly has an upstream end and a downstream end, and has a passage that extends from a secondary central body assembly inlet port to a secondary central body assembly exit port. Lastly, the assembly has a modular tip adapter mounted on the dispensing cartridge tip and affixed to the secondary central body assembly, where the modular tip adapter has an exit port and an opening to receive the dispensing cartridge tip and has an adapter passage from an adapter passage inlet port to an adapter passage exit port within the adapter. The adapter also has a primary adapter passage formed by an interior wall of the adapter and an exterior surface of the dispensing cartridge tip that extends from the adapter passage exit port to the adapter outlet port, where the secondary central body assembly outlet port is located to interconnect with the adapter passage inlet port.

A further embodiment of the present invention relates to a dispensing device to dispense a reactive chemical composition. This device comprises a body that includes a triggering device, a dispensing cartridge having two dispensing cartridge inlet ports and a dispensing cartridge tip, where the dispensing cartridge tip has an exit, and where the dispensing cartridge includes a dispensing cartridge valve to control the flow of material from the dispensing cartridge inlet ports to the exit, a control device to actuate the dispensing cartridge valve in response to a signal from the triggering device, and a modular mixing assembly. The modular mixing assembly includes a primary central body shaped to accept the dispensing cartridge, where the primary central body has an upstream end and a downstream end, and has a pair of opposed primary central body passages that each extend from a primary central body inlet port to a primary central body exit port, and where the primary central body exit port is spaced to interconnect with corresponding dispensing cartridge inlet ports. The modular mixing assembly also includes a first modular valve block to channel flow of a fluid from a first external source to one of the primary central body inlet ports and a second modular valve block to channel flow of a fluid from a second external source to the other of the primary central body inlet ports. In addition, the modular mixing assembly includes a secondary central body assembly attached to the downstream end of the primary central body, where the secondary central body assembly has an upstream end and a downstream end, and has a passage that extends from a secondary central body assembly inlet port to a secondary central body assembly exit port. Lastly, the modular mixing assembly has a modular tip adapter mounted on the dispensing cartridge tip and affixed to the secondary central body assembly, where the modular tip adapter has an exit port and an opening to receive the dispensing cartridge tip and has an adapter passage from an adapter passage inlet port to an adapter passage exit port within the adapter. The adapter has a primary adapter passage formed by an interior wall of the adapter and an exterior surface of the dispensing cartridge tip that extends from the adapter passage exit port to the adapter outlet port, where the secondary central body assembly outlet port is located to interconnect with the adapter passage inlet port.

BRIEF DESCRIPTION OF THE DRAARMS

Figure 5:
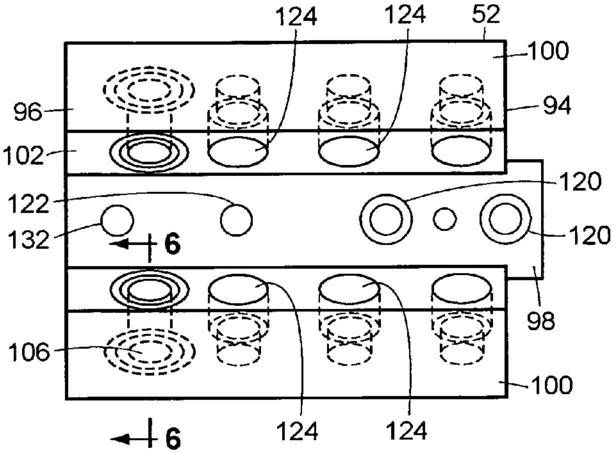
Figure 6:
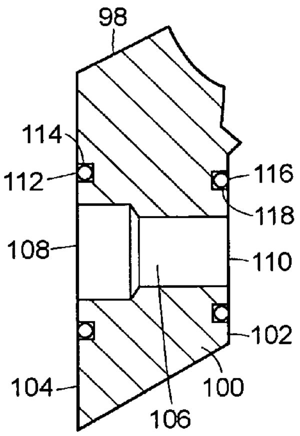
Figure 7:
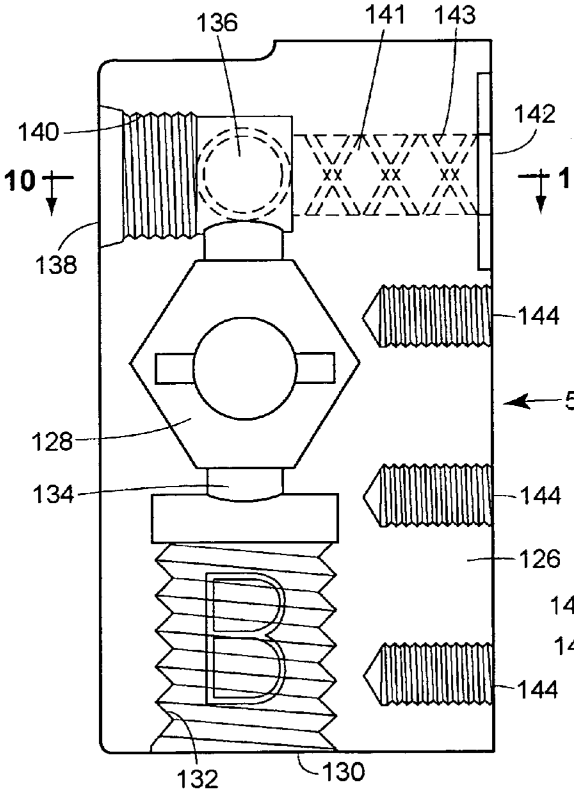
Figure 10:
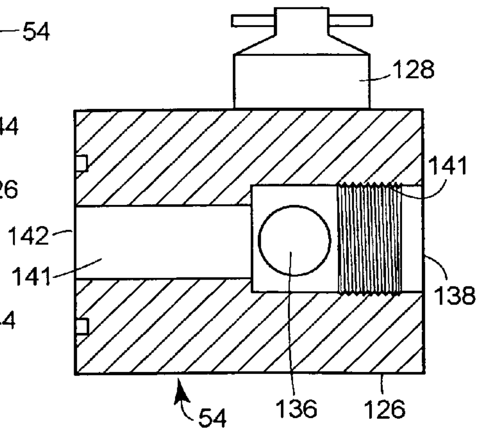
Figure 8:
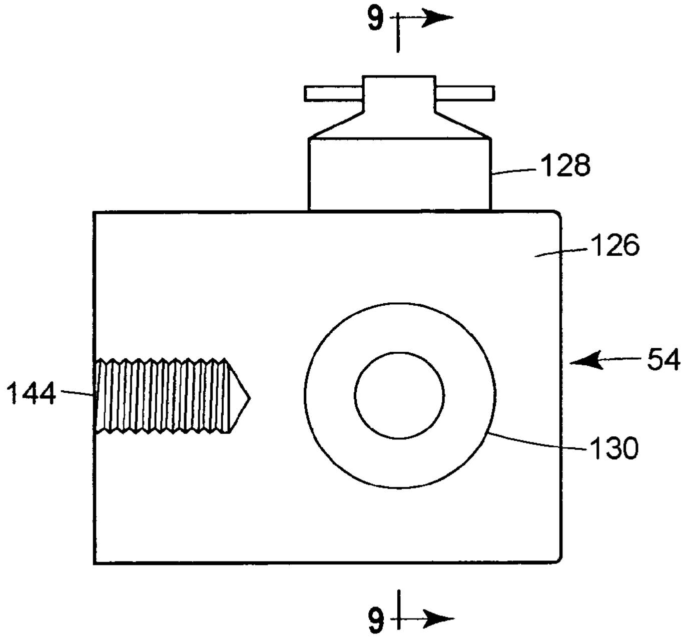
Figure 9:
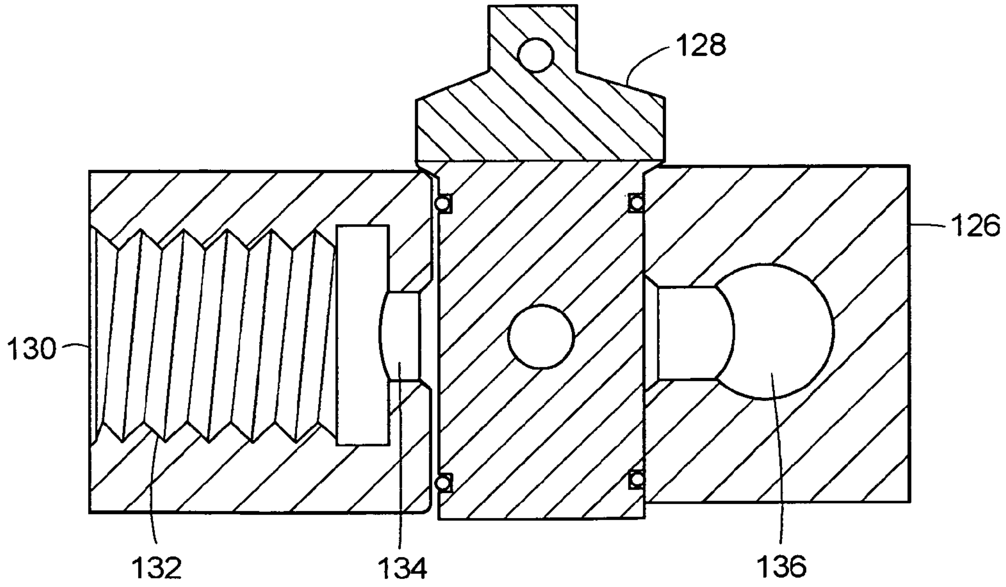
Figure 11:
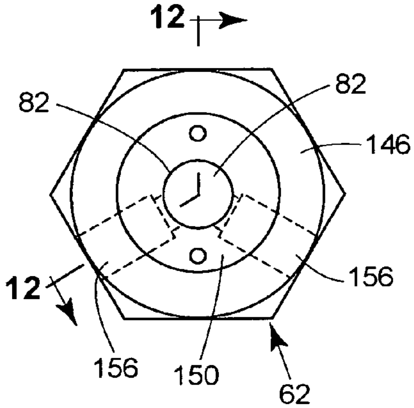
Figure 12:
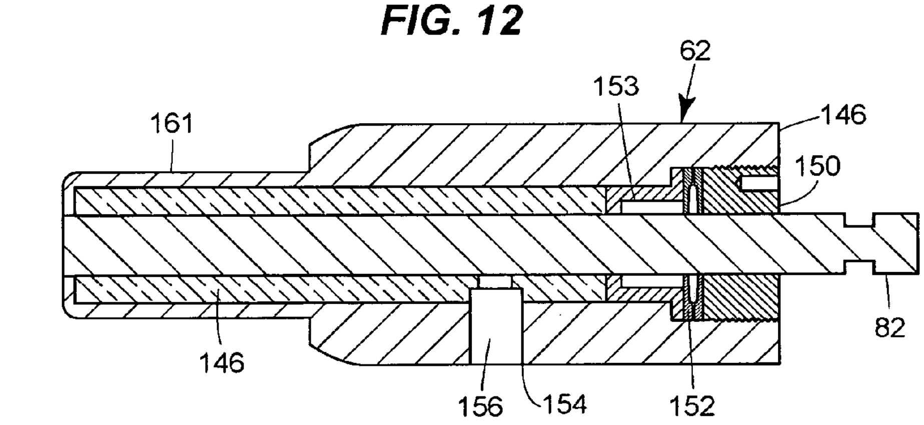
Figure 12A:
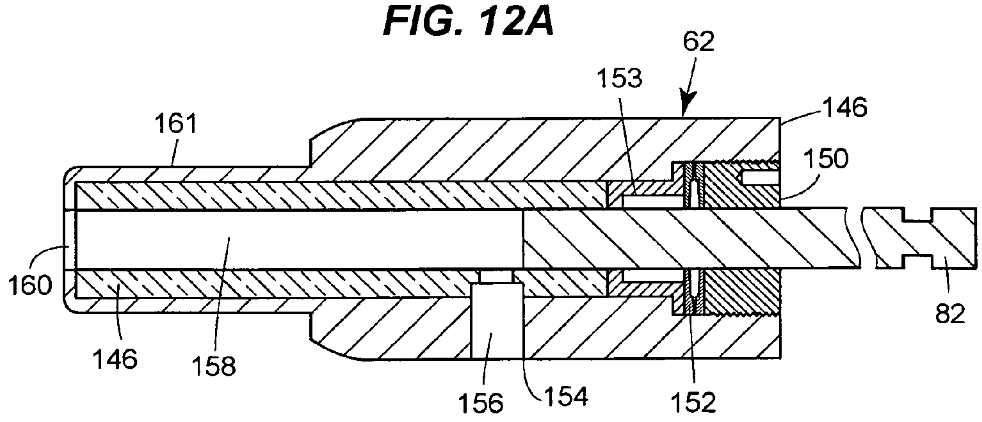
Figure 13:
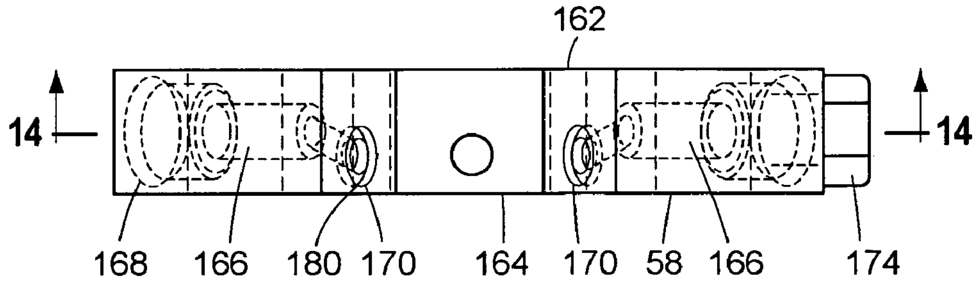
Figure 14:
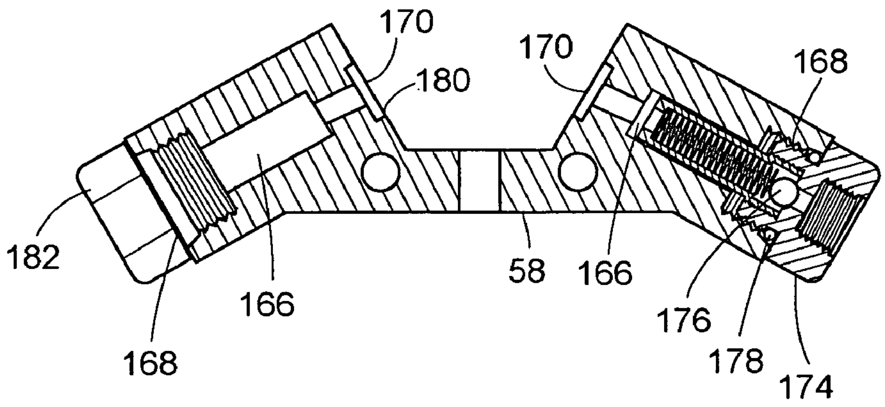
Figure 15:
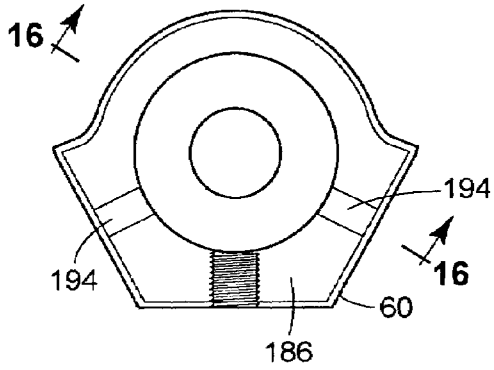
Figure 16:
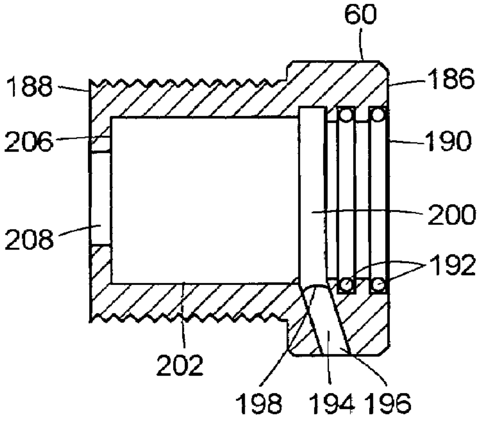
Figure 17:
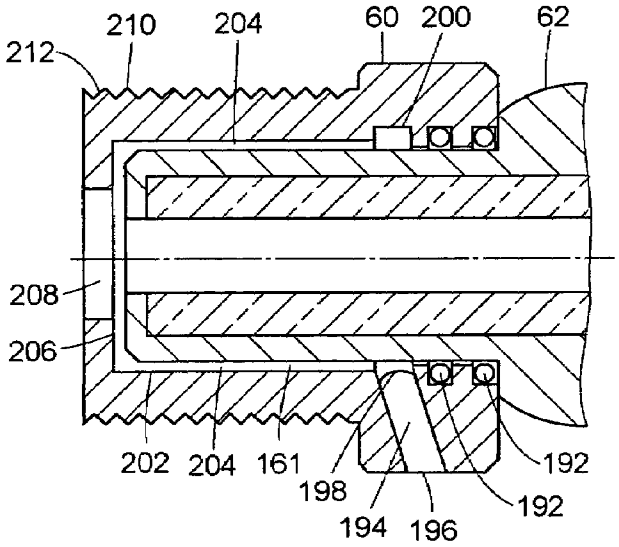
Figure 18:
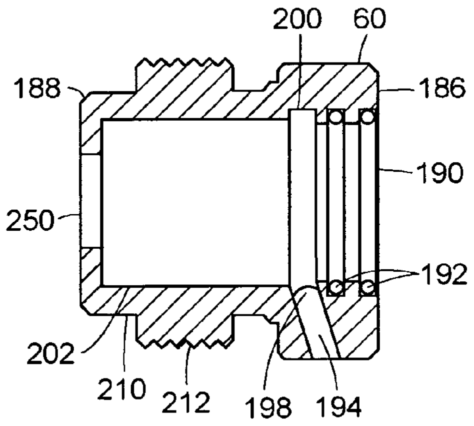
Figure 19:
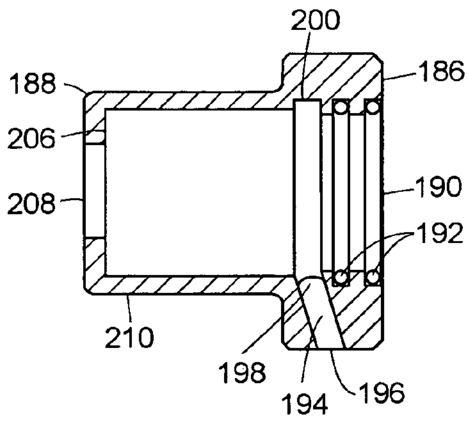
Figure 20:
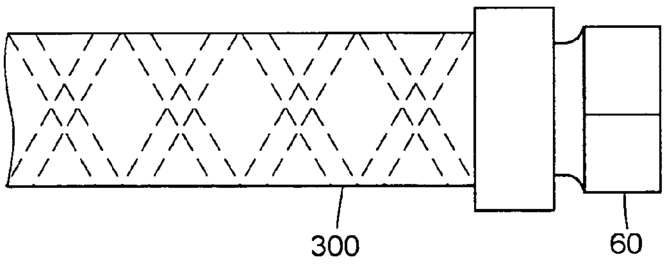
Figure 21:
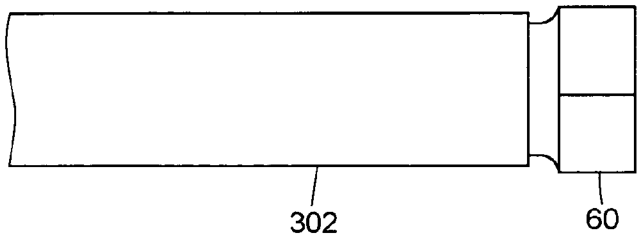
Figure 22:
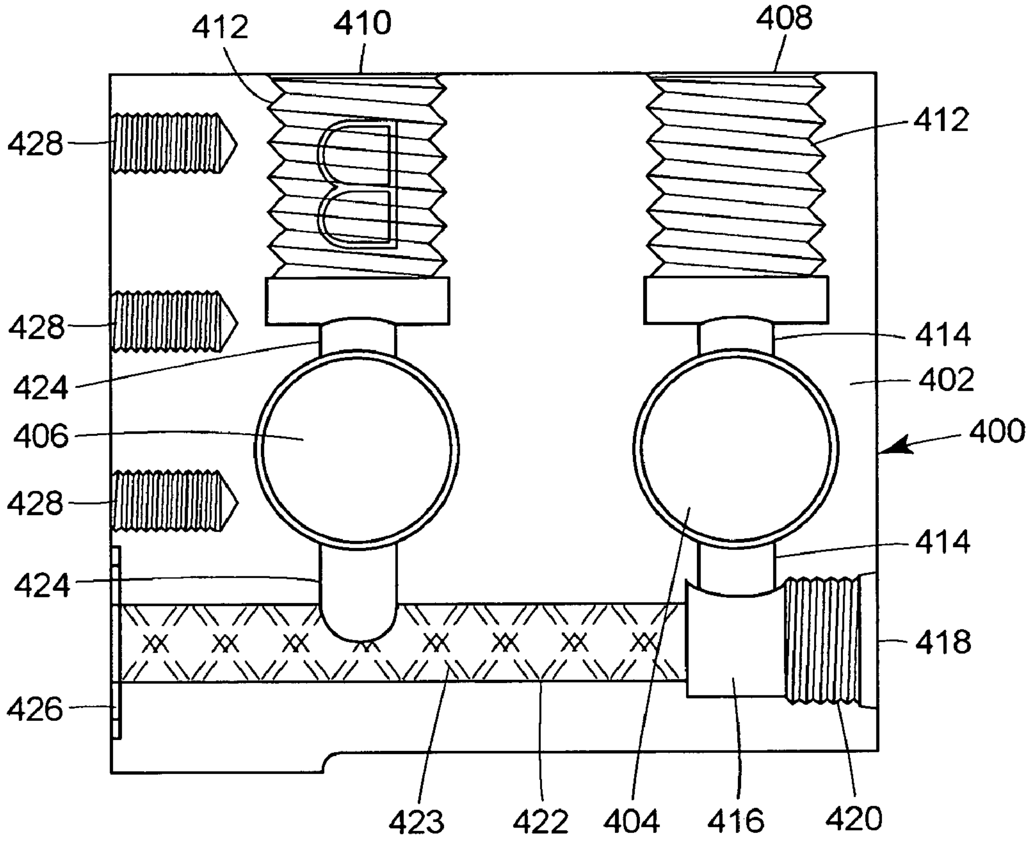

FIG. 5 a plan view of one embodiment of a primary central body of the present invention;

FIG. 6 is a sectional view generally taken along the line 6-6 in FIG. 5;

FIG. 7 is a plan view of one embodiment of a modular valve block of the present invention;

FIG. 8 is an elevational view of the valve block of FIG. 7 taken from the inlet port end;

FIG. 9 is a sectional view generally taken along the line 9-9 in FIG. 7;

FIG. 10 is a sectional view generally taken along the line 10-10 in FIG. 8;

FIG. 11 is an elevational view of a dispensing cartridge usable with the present invention taken from the upstream or controller end;

FIG. 12 is a sectional view generally taken along the line 12-12 in FIG. 11;

FIG. 12*a* is a view similar to FIG. 12 with the valve rod in the dispensing position;

FIG. 13 is a plan view of one embodiment of a secondary central body of the present invention;

FIG. 14 is a sectional view generally taken along the line 14-14 in FIG. 13;

FIG. 15 is an elevational view of one embodiment of a tip adapter of the present invention from the upstream end;

FIG. 16 is a sectional view generally taken along the line 16-16 in FIG. 15;

FIG. 17 is a sectional view similar to FIG. 16 including a portion of the sectional view of FIG. 11 to show the interaction of the parts;

FIG. 18 is a sectional view similar to that of FIG. 16 of a further embodiment of the tip adapter;

FIG. 19 is a sectional view similar to that of FIG. 16 of an additional embodiment of the tip adapter;

FIG. 20 is an elevational view of a static mixer attached to the modular tip adapter;

FIG. 21 is an elevational view of a portion of a tube or hose attached to a modular tip adapter; and FIG. 22 is a plan view of a further embodiment of a modular valve block.

DETAILED DESCRIPTION OF THE PREFERRED EMBODIMENTS

Figure 1:
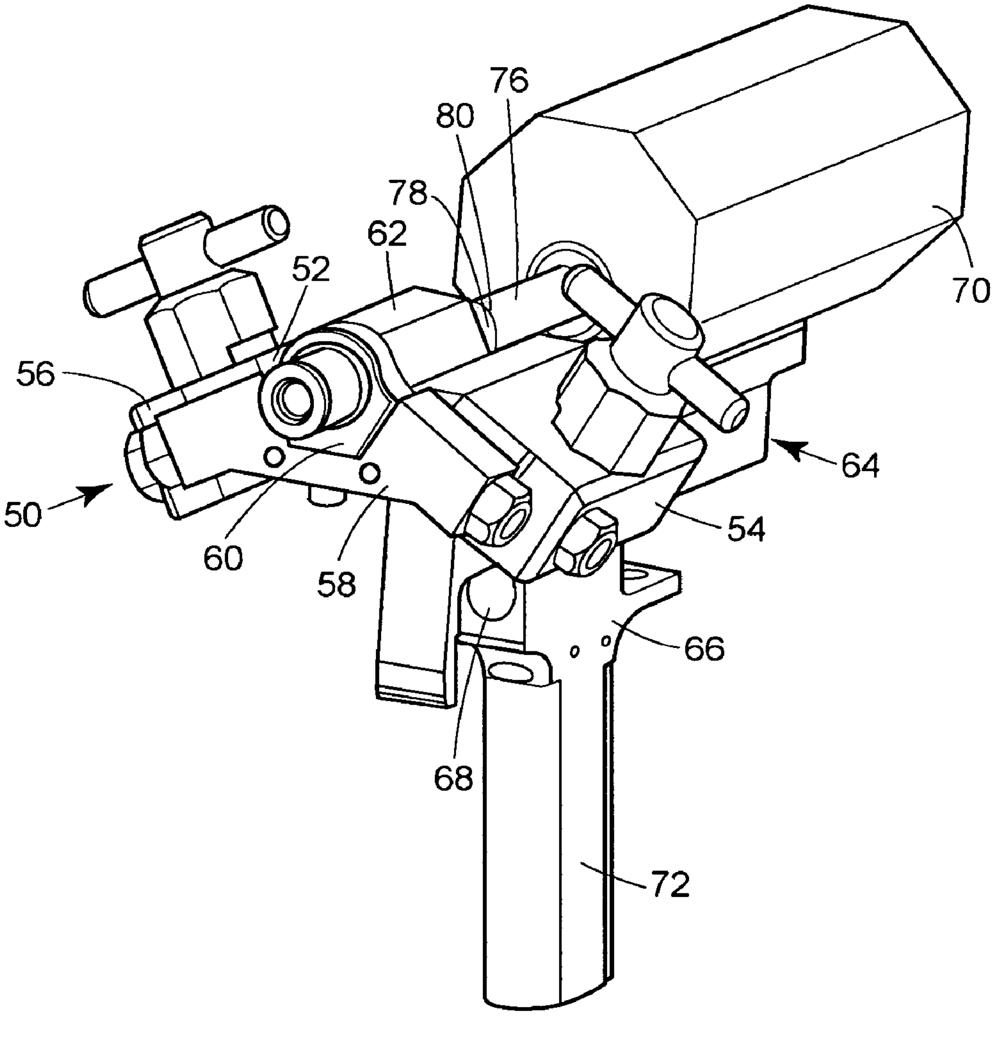
FIG. 1 is an isometric view of a dispensing device incorporating one embodiment of a mixing assembly of the present invention.
Figure 2:
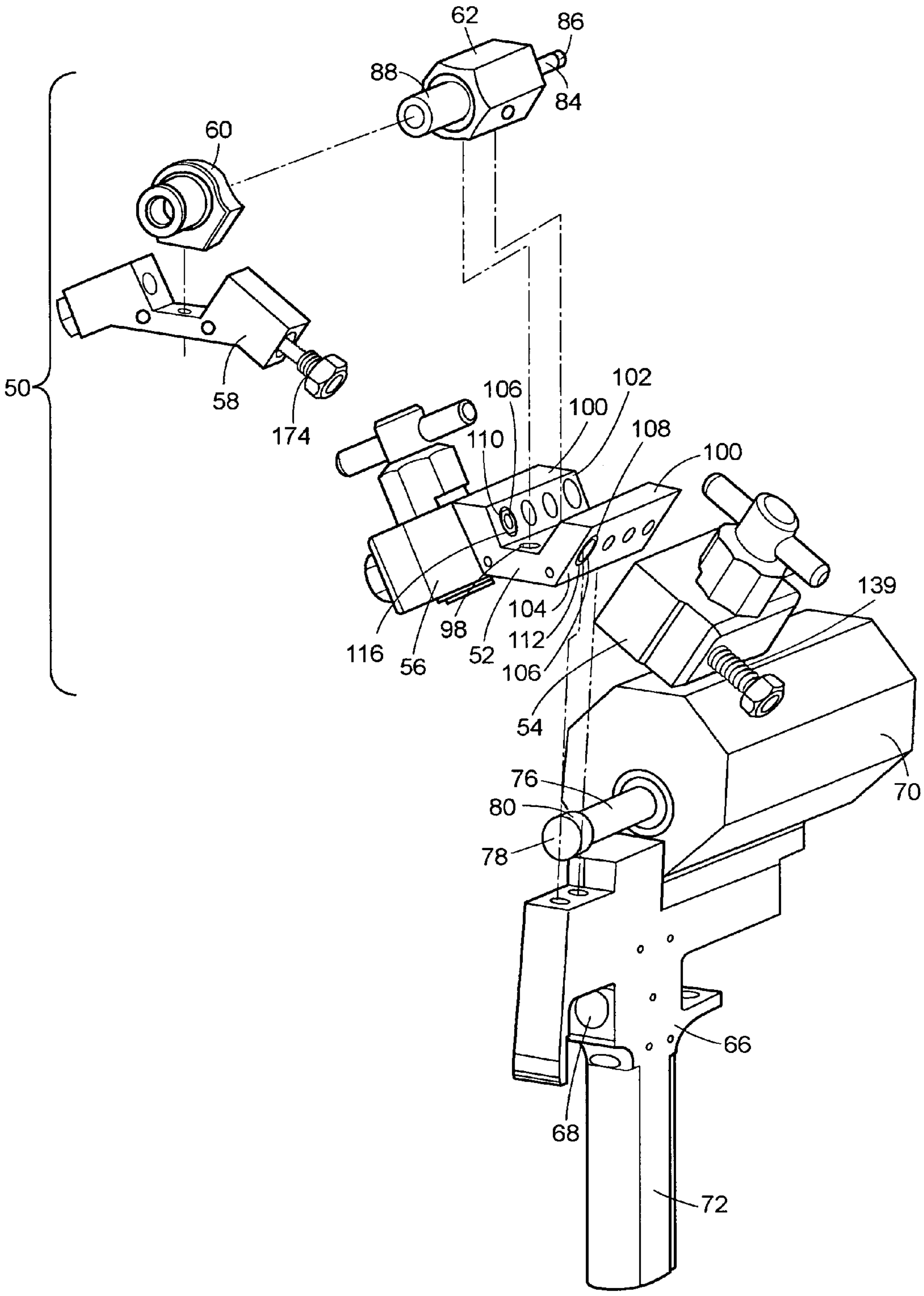
FIG. 2 is an exploded view the dispensing device of FIG. 1.
Figure 3:
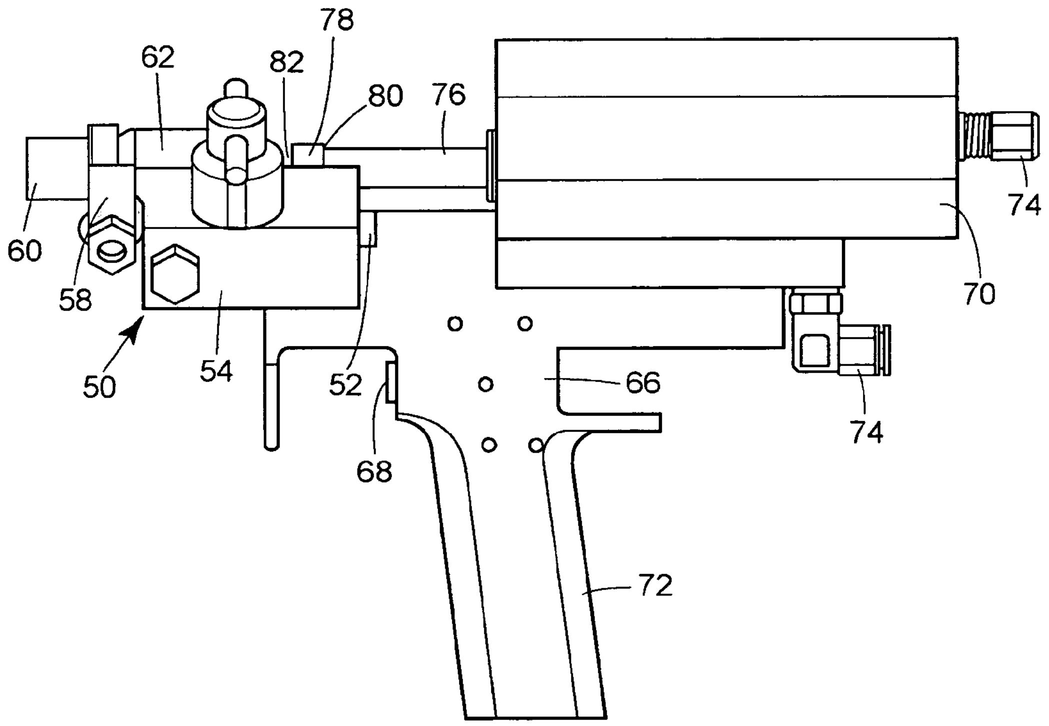
FIG. 3 is an elevational view of the dispensing device of FIG. 1.

As shown in FIGS. 1 to 3, a modular mixing assembly 50 has a primary central body 52, a first and second modular valve blocks 54, 56, a secondary central body 58, and a modular tip adapter 60. The modular mixing assembly 50 is designed to be used in conjunction with a dispensing cartridge 62. The modular mixing assembly 50 is mounted on a dispensing device 64.

In addition to the modular mixing assembly 50, the dispensing device 64 includes the dispensing cartridge 62, a body 66, a triggering device 68, and an actuator device 70. The body 66 also can include a handle 72 or other hand hold structure. In addition, if the dispensing device 64 is particularly heavy, the body 66 can be fitted with a mount or connector (not shown) to support the dispensing device 64 so that the dispensing device 64 can be manipulated by the user without having to bear the entire weight of the dispensing device 64. In the embodiment shown, the control device 70 typically uses air pressure to actuate the dispensing device 64. Compressed air enters and exits the control device 70 through two air inlets 74. The operation of the control device 70 is well known to those of skill in the art and will not be further discussed. The control device 70 includes a control rod 76 that has a quick connect fitting 78 at a distal end 80 of the control rod 76.

The dispensing cartridge 62 has a valve rod 82 that has a complementary connection 84, for instance a groove, at a proximal end 86 of the valve rod 82. The quick connect fitting 78 and the complementary connection 84 are designed to interfit to allow the dispensing cartridge 62 to be easily replaced. The dispensing cartridge 62 can be affixed in a removable fashion to the modular mixing assembly by bolts, screws or other similar conventional attachment devices. The modular tip adapter 60 is placed on a dispensing cartridge tip 88. The triggering device 68 can be located in a convenient position within the body 66. For instance, in a hand held device the triggering device 68 can be located so that it can be easily operated by a finger of a hand that grasps the handle 72.

Figure 4:
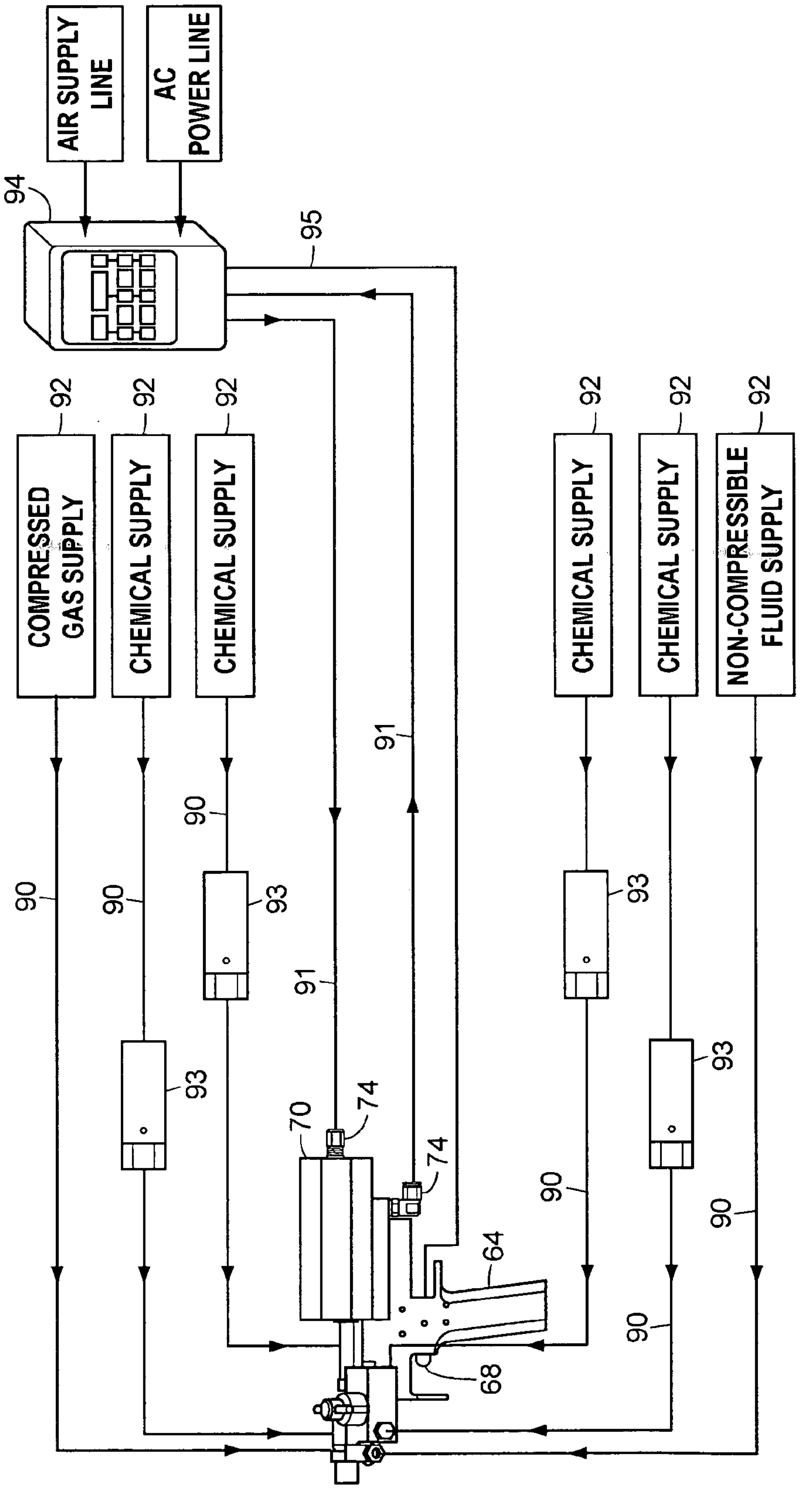
FIG. 4 is a schematic view of the device of FIG. 3 in use within one environment.

As illustrated in FIG. 4, the dispensing device 64 is connected by tubing 90 to a series of sources of material to be mixed 92. There can be any number of separate sources of material to be mixed 92 and each separate source of material to be mixed 92 is connected by separate tubing 90 to various input ports on the dispensing device 64 as will be described hereinafter. The triggering device 68 is connected to a control device 94 that controls the flow of air through air hoses 91 to the actuator device 70 through the inlet ports 74 using a control connector 95, typically an electrical connection. The sources of material to be mixed 92 are kept under pressure by any conventional method, if desired. As the triggering device 68 is pressed, compressed air will flow to the actuator device 70 that will in turn cause the actuator rod 76 to move opening the dispensing cartridge 62 so that the materials can flow to the dispensing device 64 and be properly mixed and dispensed as will be discussed hereinafter. Flow control from the separate sources of material 92 to the various inlet ports can be controlled by any convention method including the use of optional in line flow control devices 93.

As seen in FIGS. 5 and 6, the primary central body 52 has a upstream end 94, and a downstream end 96. The primary central body 52 also has a base 98, and first and second arms 100. The arms 100 are attached to the base 98 at approximately a 30 degree angle to accommodate the dispensing cartridge 62. The exact shape of the base 98 and the first and second arms 100 is not important except that the shape should match the exterior shape of the dispensing cartridge 62. Typical dispensing cartridges 62 often have a hex shape and the primary central body 52 should have a complementary shape. The arms 100 and the base 98 have a top surface 102 and a bottom surface 104. Each arm 100 has a primary central body passage 106 that extends through each arm 100 from a primary central body inlet port 108 to a primary central body outlet port 110. A seal 112, such as an o-ring, surrounding each primary central body inlet port 108 is placed in a seal recess 114 in the bottom surface 104. A similar seal 116 surrounding each primary central body outlet port 110 is placed in a seal recess 118 in the top surface 102. In addition the primary central body 52 has at least one attachment aperture 120 in the base 98 to enable the primary central body 52 to be attached to a dispensing device 64. In addition, the base 98 also includes at least one attachment aperture 122 to enable the dispensing cartridge 62 to be attached to the primary central body 52 using bolts or other conventional fasteners (not shown). Further, each arm 100 has at least one attachment aperture 124 to enable the primary central body 52 to be attached to the first and second modular valve blocks 54, 56.

Referring to FIGS. 7-10, the first and second modular valve blocks 54, 56 are similar in design and the design of the first modular valve block 54 will be described. The first modular valve block 54 includes a body 126, and a valve 128. The body 126 has an inlet port 130 to accept flow of a material from a first source of supply 92. The inlet port 130 includes a connection device such as threads 132 to enable the tubing 90 to be connected directly to the inlet port 130. A flow channel 134 connects the inlet port 130 to a mixing chamber 136 while passing through the valve 128 when the valve 128 is in the on or partially on position. The body 126 also has second inlet port 138 with threads 140 or another equivalent connection device to enable a second source of supply 90 to be connected via tubing 92 to the second inlet port 138. The second inlet port is connected to the mixing chamber 136. Optionally, as shown in FIG. 2, a filter screen 139 can be inserted into the second inlet port 138. This filter screen 139 extends into the mixing chamber 136 and adds in mixing by creating turbulent flow within the mixing chamber 136. Fluid will flow from the first inlet port 130 and the second inlet port 138 and mix in the mixing chamber 136. This mixed fluid will then flow through a second flow channel 141 to an outlet port 142. If desired, an optional static mixer 143 can be added in the second flow channel 141 to increase pre-mixing of the components from the inlet port 130, and the second inlet port 138. The outlet port 142 is situated so that it mates with the inlet port 108 when the primary central body 52 and the modular valve block 54 are joined together. The body 126 will include at least one threaded recess 144 (shown in phantom in FIG. 7). Bolts or similar fastening devices are passed through apertures 124 in the central body 52 into the threaded recess 144 to fasten the modular valve blocks 54 and 56 to the central body 52.

With reference to FIGS. 11, 12, and 12*a* the dispensing cartridge 62 has a main body 146 through which the valve rod 82 passes. The main body 146 also includes a plastic inner liner 148 that cooperates with the valve rod 82 to control the flow of fluids through the dispensing cartridge 62. The cartridge also includes a backup nut 150, a washer 152, and a spacer 153 to hold the valve rod 82 in position and form a seal to prevent the reverse flow of fluids. Fluids enter the dispensing cartridge 62 through ports 154 that line up with the outlet ports 110 in the central body 52. There are typically two ports 154 in each dispensing cartridge. Each of the ports 154 is in communication with a cartridge passage 156. As the valve rod 82 is withdrawn to a point upstream of the cartridge passages 156, fluids will flow through the cartridge passages 156 into a central cartridge passage 158 and mix by impingement in the central cartridge passage 158. The mixed fluid then flows downstream to the cartridge exit 160. The dispensing cartridge 62 also has a cartridge tip surface 161 that has a generally reduced cross-section compared to the main body 146.

In FIGS. 13 and 14, the secondary central body 58 has an upstream end 162 and a downstream end 164. The secondary central body 58 also has at least one secondary central body passage 166. Each secondary central body passage has an inlet port 168 and an outlet port 170. The inlet port 168 may be optionally and preferably fitted with a check valve assembly 174. The check valve assembly 174 includes a ball check valve 176 and a seal 178. The check valve assembly 174 is fitted using threads into the inlet port 168. Surrounding the outlet port 170 is a seal 180 such that when the modular cartridge tip adapter 60 is affixed to the secondary central body 58, a fluid tight seal is formed. If there are more than one secondary central body passage 166, it generally is necessary to include a further check valve assembly 174 in the secondary central body passage 166 to prevent cross contamination of the various components flowing through the secondary body. In general, the secondary central body 58 is used to introduce additional components into the reactive mixture downstream from the initial mixing point. Examples of these later added components include compressible fluids such as gasses including compressed air or nitrogen; and non-compressible fluids such as solvents, water, water mixture, coloring agents, and the like. If it becomes necessary to block off one of the secondary central body passages 166, a threaded plug 182 can be used. The compressible fluids can be used to change the end properties of the resulting foam by injecting gas into the foam as the foam exits the dispensing device 64. For instance, adding air through one of the secondary central body passages 166 can change the spray pattern, the density and structure of the foam. The non-compressible fluids that are added through one or both of the secondary central body passes 166 can also be either used to flush or clean the dispensing device 64 or to modify some properties of the resulting foam if further mixing is provided, such as by using a static mixer downstream as discussed hereinafter. Flushing agents, such as solvents, water, and water solvent mixtures can also be introduced through one or both of the secondary central body passages 166.

With reference to FIGS. 15-17, the modular cartridge tip adapter 60 has a body 184 having an upstream end 186 and a downstream end 188. The upstream end 186 has an opening 190 with associated seals 192. The opening should be sized to accommodate the cartridge tip surface 161 such that the seals 192 form a fluid tight seal in conjunction with the cartridge tip surface 161. The modular tip adapter 60 also has at least one adapter passage 194. These adapter passages 194 each will have an adapter passage inlet port 196 and an adapter passage outlet port 198. All adapter passage outlet ports 198 will terminate within a groove 200 formed in an interior wall 202 of the modular tip adapter 60. The adapter passage inlet ports 196 are located on an exterior mating surface 204 of the modular tip adapter 60 such that when the modular tip adapter 60 is affixed to the secondary central body 58 a fluid tight seal is formed so that fluid can pass from the secondary central body passage 166 to the adapter passage 194 without leakage. The groove 200 distributes the fluid entering through the adapter passages 194 around the interior wall 202. The fluid then flows through a passage 204 formed by the interior wall 202 and the cartridge tip surface 161. At the downstream end 188 in the embodiment as shown, the modular tip adapter 60 includes a wall 206 that redirects the fluid flowing through the passage 204 so that this fluid will mix with the fluid that exits the exit port 160 of the dispensing cartridge 62. This combined stream then exits though a exit port 208 on the modular tip adapter 60.

The modular tip adapter 60 also has an exterior surface 210. This exterior surface 210 can be configured in a number of ways. In the present embodiment, the exterior surface 210 includes threads 212 to enable the modular tip adapter 60 to be connected to a hose, tube or static mixer assembly.

FIGS. 18 and 19 show other embodiments of the modular tip adapter 60. In FIG. 18, the downstream end 188 has an outlet port 250 that does not include a wall 206. In this embodiment, the fluid passing through the passage 204 will be dispensed co-axially with the fluid exiting the exit port 160. This embodiment might be used with a static mixer downstream from the outlet port 250 that will thoroughly mix the two streams. In FIG. 19, the exterior surface 210 is smooth and does not include any threads. This type of modular tip adapter might be used with a tube or other tip can be slipped over the modular tip adapter 60 and either held in place by hand or by the pressure the tube exerts on the exterior surface 210.

FIG. 20 shows a static mixer 300 attached by threads (not visible) to the modular tip adapter 60 of FIG. 18. The static mixer 300 further mixes the various fluids prior to dispensing. FIG. 21 shows a straight walled tube or hose 302 attached to the modular tip adapter 60 of FIG. 19. This tube can be used to direct the mixed fluids to a location that might be hard to reach such as behind a wall. This type of arrangement is used for foam placement in a specific location deep into an insulation panel, door, cabinet wall, or cavity behind an existing wall through an opening in the wall.

FIG. 22 shows a modular valve block 400 that has a body 402, a first valve 404 and a second valve 406. The body 402 has two primary inlet ports 408, 410 to accept flow of a material from a first source of supply 92 and an additional source of supply 92. The inlet ports 408, 410 include a connection device such as threads 412 (shown in phantom) to enable the tubing 92 to be connected directly to the inlet ports 408, 410. A first flow channel 414 (shown in phantom) connects the primary inlet port 408 to a mixing chamber 416 (shown in phantom) while passing through the valve 404 when the valve 404 is in the on or partially on position. Similar to the modular valve block 54, the body 402 also has second inlet port 418 with threads 420 (shown in phantom) or another equivalent connection device to enable a second source of supply 92 to be connected via tubing 90 to the second inlet port 418. The second inlet port 418 is connected to the mixing chamber 416. Optionally, as shown in FIG. 2, a filter screen 139 can be inserted into the second inlet port 418. This filter screen 139 extends into the mixing chamber 416 and adds in mixing by creating turbulent flow within the mixing chamber 416. If desired, fluid will flow from the first inlet port 410 and the second inlet port 418 and mix in the mixing chamber 416. This mixed fluid will then flow through a second flow channel 422 (shown in phantom). A third flow channel 424 (shown in phantom) connects the primary inlet port 410 to the second flow channel 422 while passing through the valve 406 when the valve 406 is in the on or partially on position. Optionally, a static mixer 423 (shown in phantom) can be placed in the second flow channel 422 extending from chamber 416 to port 426. The static mixer is used to pre-mix the primary fluid flows from 410 & 408, when added premixing is needed. The fluid from the third flow channel 424 mixes with the fluid coming from the mixing chamber 416 through the second flow channel 422 and the mixed fluid flows through the static mixer, or a portion of the static mixer, to an outlet port 426. The outlet port 426 is situated so that it mates with the inlet port 108 when the primary central body 52 and the modular valve block 400 are joined together. The body 402 will include at least one threaded recess 428 (shown in phantom in FIG. 7). Bolts are passed through apertures 124 in the central body 52 into the threaded recess 428 to fasten the modular valve block 400 to the central body 52.

I claim:

1. A modular mixing assembly for use with a dispensing cartridge having a dispensing cartridge tip, the cartridge used to dispense a reactive chemical composition, the assembly comprising:

a primary central body shaped to accept the dispensing cartridge, the primary central body having an upstream end and a downstream end, and having a pair of opposed primary central body passages that each extend from a primary central body inlet port to a primary central body exit port, the primary central body exit port being spaced to interconnect with corresponding dispensing cartridge inlet ports;

a first modular valve block to channel flow of a fluid from a first external source to one of the primary central body inlet ports;

a second modular valve block to channel flow of a fluid from a second external source to the other of the primary central body inlet ports;

a secondary central body assembly attached to the downstream end of the primary central body, the secondary central body assembly having an upstream end and a downstream end, and having a passage that extends from a secondary central body assembly inlet port to a secondary central body assembly exit port; and a modular tip adapter mounted on the dispensing cartridge tip and affixed to the secondary central body assembly, the modular tip adapter having an exit port and an opening to receive the dispensing cartridge tip and having an adapter passage from an adapter passage inlet port to an adapter passage exit port within the adapter, the adapter having a primary adapter passage formed by an interior wall of the adapter and an exterior surface of the dispensing cartridge tip that extends from the adapter passage exit port to the adapter outlet port, the secondary central body assembly outlet port being located to interconnect with the adapter passage inlet port.

2. The modular mixing assembly of claim 1, wherein the first modular valve block controls the flow of material from the first external source and from a third external source.

3. The modular mixing assembly of claim 2, wherein the flow of material from the first external source and the flow of material from the third external source are separately controlled.

4. The modular mixing assembly of claim 1, wherein the first modular valve block includes a static mixer in the path of flow of the fluid from the first external source to one of the primary central block inlet ports.

5. The modular mixing assembly of claim 1, wherein the primary adapter passage is annular.

6. The modular mixing assembly of claim 1, wherein the adapter outlet port is shaped so that fluid flow from the primary adapter passage is redirected to impinge upon a flow of material from an exit of the dispensing cartridge.

7. The modular mixing assembly of claim 1, wherein there is a flow control device in the flow path of the material from the first external source and there is a flow control device in the flow path of the material from the second external source.

8. The modular mixing assembly of claim 1, wherein the secondary central body assembly inlet port is connected to a source of a fluid.

9. The modular mixing assembly of claim 8, wherein the fluid is a compressible fluid.

10. The modular mixing assembly of claim 9, wherein the compressible fluid is air or other compressed gas.

11. The modular mixing assembly of claim 8, wherein the fluid is a non-compressible fluid.

12. The modular mixing assembly of claim 11, wherein the non-compressible fluid is selected from the group consisting of water, solvent, coloring agent, and mixtures thereof.

13. The modular mixing assembly of claim 1, wherein the secondary central body assembly includes a second secondary central body assembly passage extending from a second secondary central body assembly inlet port to a second secondary central body assembly outlet port and wherein the adapter has a second adapter passage from a second adapter inlet port to a second cartridge tip exit port within the adapter and wherein the first and second secondary central body assembly passages each include a check valve.

14. The modular mixing assembly of claim 1, wherein the modular tip adapter has an external surface and the external surface includes screw threads.

15. The modular mixing assembly of claim 14, wherein the external surface screw threads receive an attachment.

16. The modular mixing assembly of claim 15, wherein the attachment is a static mixer.

17. The modular mixing assembly of claim 12, wherein the modular tip adapter has an external surface and the external surface is smooth and wherein the attachment is a tube.

18. A dispensing device to dispense a reactive chemical composition, the device comprising:

a body that includes a triggering device;

a dispensing cartridge having two dispensing cartridge inlet ports and a dispensing cartridge tip, the dispensing cartridge tip having an exit, the dispensing cartridge including a dispensing cartridge valve to control the flow of material from the dispensing cartridge inlet ports to the exit;

a control device to actuate the dispensing cartridge valve in response to a signal from the triggering device; and a modular mixing assembly that includes:

a primary central body shaped to accept the dispensing cartridge, the primary central body having an upstream end and a downstream end, and having a pair of opposed primary central body passages that each extend from a primary central body inlet port to a primary central body exit port, the primary central body exit port being spaced to interconnect with corresponding dispensing cartridge inlet ports;

a first modular valve block to channel flow of a fluid from a first external source to one of the primary central body inlet ports;

a second modular valve block to channel flow of a fluid from a second external source to the other of the primary central body inlet ports;

a secondary central body assembly attached to the downstream end of the primary central body, the secondary central body assembly having an upstream end and a downstream end, and having a passage that extends from a secondary central body assembly inlet port to a secondary central body assembly exit port; and a modular tip adapter mounted on the dispensing cartridge tip and affixed to the secondary central body assembly, the modular tip adapter having an exit port and an opening to receive the dispensing cartridge tip and having an adapter passage from an adapter passage inlet port to an adapter passage exit port within the adapter, the adapter having a primary adapter passage formed by an interior wall of the adapter and an exterior surface of the dispensing cartridge tip that extends from the adapter passage exit port to the adapter outlet port, the secondary central body assembly outlet port being located to interconnect with the adapter passage inlet port.

19. The dispensing device of claim 18, wherein the body includes a handle so that the dispensing device can be manipulated by hand.

20. The dispensing device of claim 18, wherein the first modular valve block controls the flow of material from the first external source and from a third external source.

21. The dispensing device of claim 18, wherein the first modular valve block includes a static mixer in the path of flow of the fluid from the first external source to one of the primary central block inlet ports.

22. The dispensing device of claim 20, wherein the flow of material from the first external source and the flow of material from the third external source are separately controlled.

23. The dispensing device of claim 18, wherein the primary adapter passage is annular.

24. The dispensing device of claim 18, wherein the adapter outlet port is shaped so that fluid flow from the primary adapter passage is redirected to impinge upon a flow of material from the exit of the dispensing cartridge.

25. The dispensing device of claim 18, wherein there is a flow control device in the flow path of the material from the first external source and there is a flow control device in the flow path of the material from the second external source.

26. The dispensing device of claim 18, wherein the secondary central body assembly inlet port is connected to a source of a fluid.

27. The dispensing device of claim 26, wherein the fluid is a compressible fluid.

28. The dispensing device of claim 27, wherein the compressible fluid is air or other compressed gas.

29. The dispensing device of claim 26, wherein the fluid is a non-compressible fluid.

30. The dispensing device of claim 29, wherein the non-compressible fluid is selected from the group consisting of water, solvent, coloring agent, and mixtures thereof.

31. The dispensing device of claim 18, wherein the secondary central body assembly includes a second secondary central body assembly passage extending from a second secondary central body assembly inlet port to a second secondary central body assembly outlet port and wherein the adapter has a second adapter passage from a second adapter inlet port to a second cartridge tip exit port within the adapter and wherein the first and second secondary central body assembly passages each include a check valve.

32. The dispensing device of claim 31, wherein the same fluid is passed into the first and second secondary central body assembly passages and wherein the source of the fluid is commonly controlled.

33. The dispensing device of claim 31, wherein a different fluid flows into the first and second secondary central body assembly passages and wherein each source of fluid flow is separately controlled.

34. The dispensing device of claim 18, wherein the modular tip adapter has an external surface and the external surface includes screw threads.

35. The dispensing device of claim 34, wherein the external surface screw threads receive an attachment.

36. The dispensing device of claim 35, wherein the attachment is a static mixer.

37. The dispensing device of claim 18, wherein the modular tip adapter has an external surface and the external surface is smooth and wherein the attachment is a tube.

* * * * *